(12) United States Patent
Yamada et al.

(10) Patent No.: US 6,397,702 B1
(45) Date of Patent: Jun. 4, 2002

(54) DUAL CAM DIFFERENTIAL

(75) Inventors: Silvio Yamada; Tomaz Varela, both of Gahanna, OH (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/655,687

(22) Filed: Sep. 6, 2000

(51) Int. Cl.[7] ............................................... F16H 48/12
(52) U.S. Cl. ..................................................... 74/650
(58) Field of Search ......................................... 74/650

(56) References Cited

U.S. PATENT DOCUMENTS

| | | | | |
|---|---|---|---|---|
| 1,371,809 A | * | 3/1921 | Pulliam | 74/650 |
| 2,220,432 A | * | 11/1940 | Wales | 74/650 |
| 2,841,036 A | * | 7/1958 | Decker | 75/650 |
| 5,101,685 A | * | 4/1992 | Beck | 74/650 |

* cited by examiner

Primary Examiner—Dirk Wright
(74) Attorney, Agent, or Firm—Carlson, Gaskey & Olds

(57) ABSTRACT

A differential is provided by a cam associated with each of the first and second output shafts of the differential. A moving member moves axially relative to the cams when the shafts are rotating at different speeds. The moving member is driven by the differential case, and in turn, drives the two cams. The cams are fixed to rotate with respective output shafts. As the differential speed of the two cams increases, the moving member moves axially at an increasing speed. Hydraulic fluid is positioned in chambers at each end of the first moving member and limits the speed of axial reciprocation of the first moving member. As the hydraulic fluid resists additional increase in speed of the first moving member, the first moving member begins to drive the two cams, and hence the two shafts, at a more equal speed.

16 Claims, 3 Drawing Sheets

DUAL CAM DIFFERENTIAL

BACKGROUND OF THE INVENTION

This invention relates to a gear differential utilizing cam grooves to rotate two outputs, and allow relative differences in the speed of rotation of the two outputs under certain conditions.

Gear differentials are utilized in most modern vehicles. A differential receives a single drive input, and then splits that drive input between two outputs. As an example, gear differentials are utilized on most drive axles to split rotation between the two opposed wheels.

In a typical differential, a gear case surrounds the output shafts. The gear case has a gear which is driven by a drive input to rotate the case. Pinion gears rotate with the case, and engage and drive gears associated with each of the output shafts. This arrangement allows the two output shafts to rotate at differential speeds.

While standard gear differentials are widely utilized, they do require close machining tolerances, and specialized equipment to produce the required gears economically.

Moreover, under certain conditions it is desirable to not allow relative rotation between the two shafts. As an example, while some limited relative rotation may be desirable such as when the vehicle is turning, excessive differential rotation could be indicative of a slipping wheel. As an example, a wheel slipping on ice, will typically rotate at a higher speed than a wheel which is still engaged on the ground. In such situations, it would be desirable to limit relative rotation. Prior art gear differentials have not always been as successful as desired in limiting this relative rotation.

SUMMARY OF THE INVENTION

In the disclosed embodiment of this invention, a cam arrangement is associated with each of the output shafts. The two cams are connected by a first moving member having pins engaged in cam grooves in the cams. When the two output shafts are rotating at the same speed, then the moving member and its pins drive the cams associated with each output shaft at generally equal speeds. However, should the two shafts begin to rotate at different speeds, then the pins will move within the grooves, while still transmitting rotation to the cams. As the pins move within the grooves, the moving member moves axially. As the amount of relative rotation increases, the speed of the moving member also increases.

The moving member is structured such that when its speed increases, there is resistance to further increase in movement. As this resistance increases, the moving member is unable to move freely at increased speed. The moving member thus constrains the two shafts to rotate at a more equal speed.

In preferred embodiments of this invention, the moving member has a pin engaged in a slot in an inner periphery of a differential case. This pin causes the moving member to rotate with the case, but allows the moving member to move axially within the case.

Further, a second moving member is guided in a second set of cam grooves in each of the two cams associated with the shafts. The second set of grooves and the pins associated with the second moving member are offset relative to the first set. In this way, the second moving member will continue to move in a particular direction when the first moving member reaches the extremes of its cam grooves. Thus, there will be no hesitation to continued rotation of the shafts at an end of travel position in the first set of cam grooves.

The second moving member includes a pin received in an axial groove in the inner periphery of the first moving member. Thus, the first moving member and the second moving member rotate together. The pins received in the second set of grooves in the two cams from the second moving member cause the cams to rotate with the second moving member, and hence, the first moving member.

In a preferred embodiment of this invention, the resistance to movement of the first moving member is created by having a passage extend through the first moving member to interconnect fluid chambers at each end of the first moving member. Hydraulic fluid is preferably received in those chambers. As the first moving member moves, fluid moves through the passage. Valves are positioned in the passage and serve to restrict the passage as the speed of the first moving member increases. This resistance to further flow of the hydraulic fluid will result in resistance to increased speed of movement of the first moving member. As movement of the first moving member is restricted, it will drive the slower moving cam, such that the two cams are driven at a more equal speed.

These and other features of the present invention can be best understood from the following specification and drawings, the following of which is a brief description.

DETAILED DESCRIPTION OF A PREFERRED EMBODIMENT

Figure 1:
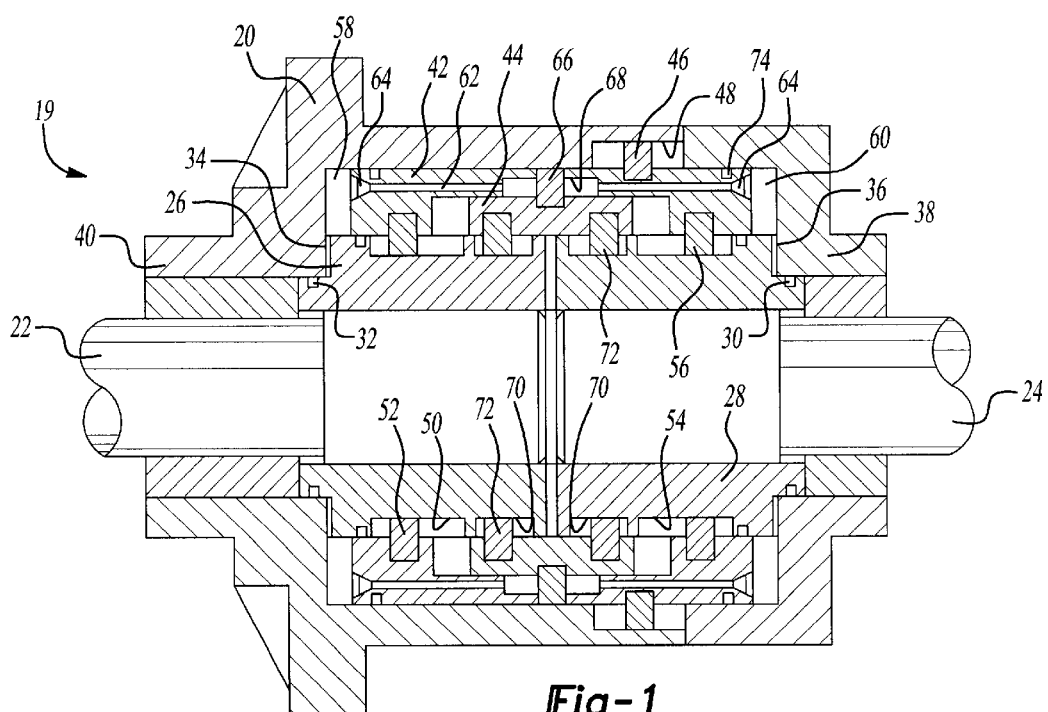
FIG. 1 is a cross-sectional view through an inventive differential.

A differential 19 is illustrated in FIG. 1 having a differential case 20 surrounding a first output shaft 22 and a second output shaft 24. A cam 26 rotates with the first output shaft 22 and a second cam 28 rotates with second shaft 24. Seals 30 and 32 seal between the cams 26 and 28 and the case 20.

Thrust washers or bearings 34 and 36 are positioned between end faces 38 and 40 of the case 20 and the cams 26 and 28. The cams are associated with a first moving member 42 and a second moving member 44. First moving member 42 includes a tooth 46 moveable within a guide slot 48 in the inner periphery of the case 20. Although one tooth 46 is illustrated, there may be a plurality of circumferentially spaced teeth moveable within circumferentially spaced slots. The teeth transmit rotation between the case 20 and the first moving member 42.

A cam groove 50 in the first cam member 26 receive pins 52 from the first moving member 42. A similar cam groove 54 is formed in the second cam 28 and receives a pin 56 from the first moving member 42. Hydraulic chambers 58 and 60 are formed at each axial end of the first moving member 42. A fluid passage 62 extends through the first moving member 42. Valve 64 is positioned at each end of the passage 62, and will be explained in greater detail below. A tooth 66 is received in the second moving member 44 and is moveable within a slot 68 in the inner periphery of the first moving member 42. The tooth 66 transmits rotation between the first moving member 42 and the second moving member 44. Again, there may be a plurality of circumferentially spaced teeth and slots.

A second set of cam grooves 70 is formed in the first and second cam members 26 and 28. Pins 72 extend from the second moving member 44 into the cams 70.

Seals 74 seal between an inner peripheral surface of the case 20 and an outer peripheral surface of the first moving member 42.

In operation, a drive input is transmitted to the case 20, as known. The case 20 rotates, and the first moving member 42 rotates due to the teeth 46 received in the slots 48. As the first moving member 42 rotates, it drives the second moving member 44 through the teeth 66. As the first and second moving members 42 and 44 rotate, they in turn rotate the cams 26 and 28 through the pins 52, 72 and 56 received in the cam grooves. However, should relative rotation occur between the shafts 22 and 24, then there will be a difference in rotational speeds of the cams 26 and 28. When this occurs, the pins will move within the cam grooves in the cams 26 and 28. As the pins move, the moving members 42 and 44 move axially, or to the left and right as shown in FIG. 1.

Figure 2:
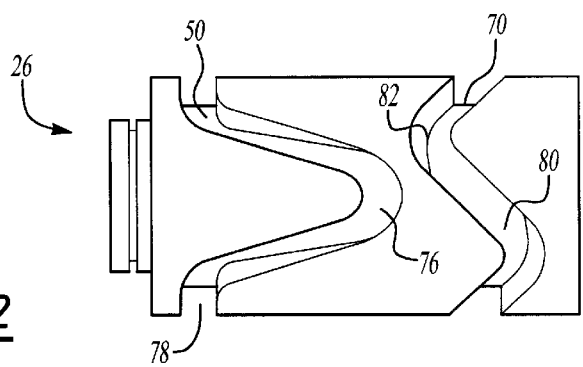
FIG. 2 is a perspective view of a cam according to the present invention.

As shown in FIG. 2, the cam 26 includes the cam grooves 50 and 70. The cam 28 will have a very similar configuration. As shown, the groove 50 has extreme ends 76 and 78 and the groove 70 has extreme ends 80 and 82. As the pins move through the groove ends, the direction of movement of the first and second moving members 42 and 44 reverses. Thus, if one of the two shafts 22 and 24 is rotating at a different speed than the other, the moving members 42 and 44 will tend to be axially reciprocating as its pins move within the respective cam grooves.

Figure 3:
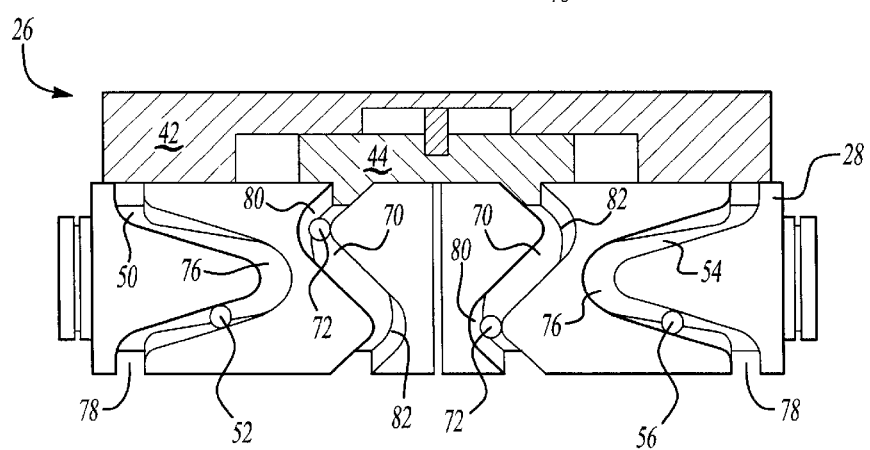
FIG. 3 is a perspective view, somewhat schematic, of the combined cam and moving member arrangement.

As shown in FIG. 3, the pins 72 received within the second set of cam grooves 70 are at a position near the one extreme end 80 of a groove. As shown, the pins 52 and 56 in the first grooves 50 and 54 are somewhere between the extremes 76 and 78. Thus, a second moving member 44 will begin to move in a distinct direction as it has reached an extreme end of its groove and will reverse its direction. However, the first moving member 42 will continue in the same direction as its pins are somewhere between the extremes. Thus, the use of the second moving member will assist in ensuring constant rotation, as any problem with continued rotation at an end of travel position when the pin reaches one extreme will be eliminated. This is eliminated since the pins in the two sets of cam grooves are offset such that the pins in both the first and second cam grooves are never at the extremes at the same time.

With operation of the differential 19 of FIG. 1, when there is relative rotation, such as when a vehicle is turning, one of the two shafts 22 and 24 is able to rotate at a slightly different speed than the other. However, the present invention does prevent undesirably increasing relative rotation. As an example, when the vehicle is being driven on ice, one of the wheels may begin to spin, and will begin to rotate at a high speed relative to the other. As this relative speed increases, then the speed of the first and second moving members 42 and 44 will increase.

Figure 4A:
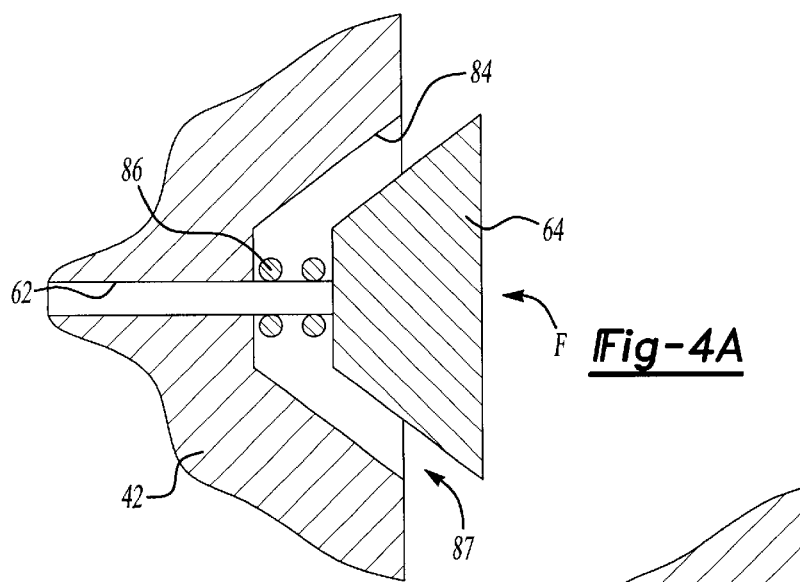
FIG. 4A shows a valve in a first position.
Figure 4B:
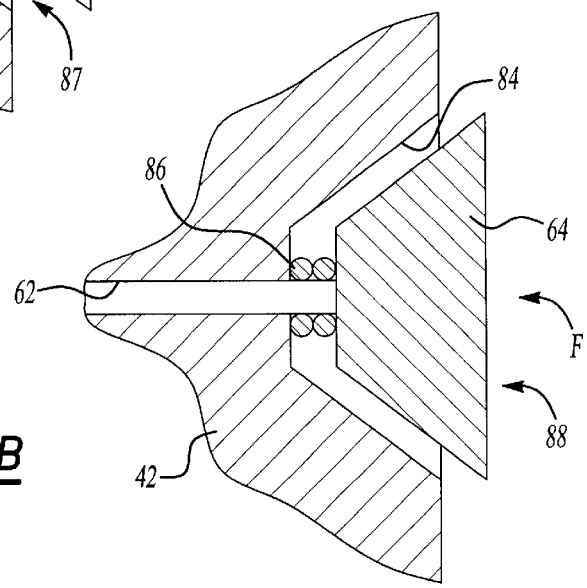
FIG. 4B shows the FIG. 4A valve in a restricted position.

FIGS. 4A and 4B show how the invention limits the relative speed as it increases. As shown in FIG. 4A, a valve seat 84 receives the valve 64, and has a spring 86 normally biasing the valve 64 outwardly to an open position 87. As the speed of axial movement of the first moving member 42 increases, the force F from the hydraulic fluid in the chambers at each end of the first moving member 42 also increases. As force F increases, the valve 64 is biased against the force of the spring 86 to the position 88 such as shown in FIG. 4B. In this position, the flow of hydraulic fluid through the passage 62 is limited when compared to the FIG. 4A position. As the flow of hydraulic fluid is limited, the movement of the first moving member 42 is limited. The first moving member 42 cannot compress the hydraulic fluid in the chambers 58 and 60, and thus if its free flow through the passage 62 is limited, the hydraulic fluid will slow further movement of the first moving member 42. As the first moving member 42 is slowed, it will begin to drive the two shafts 22 and 24 at a more equal speed.

The present invention is thus able to provide a limitation and relative rotation without complex gearing.

Figure 5:
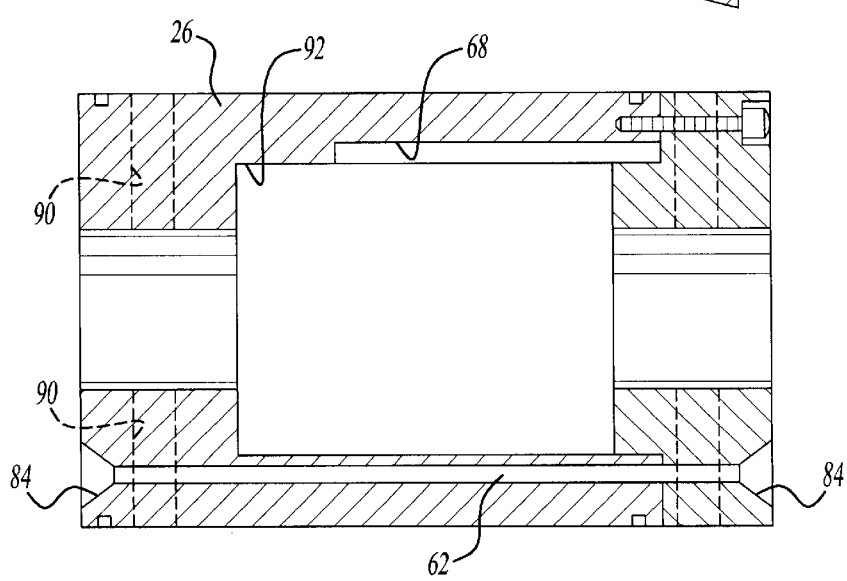
FIG. 5 is a cross-sectional view through the first moving member.

As shown in FIG. 5, the first moving member 42 incorporates the slot 68, and an inner peripheral chamber 92 which receives the second moving member. Passages 90 receive the pins 52 and 56. Passage 62 extends through the length of the first moving member 42.

Figure 6:
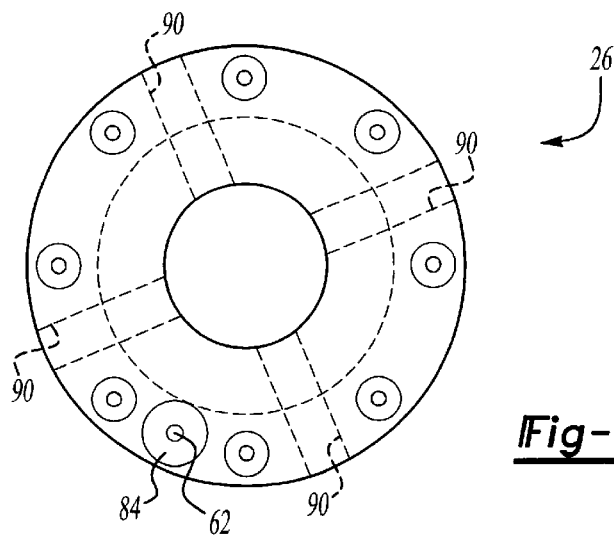
FIG. 6 is an end view of the first moving member.

In the embodiment shown in FIG. 6, preferably only a single passage 62 extends through the first moving member 42. As shown in FIG. 6, there are four equally spaced pin slots 90.

Figure 7:
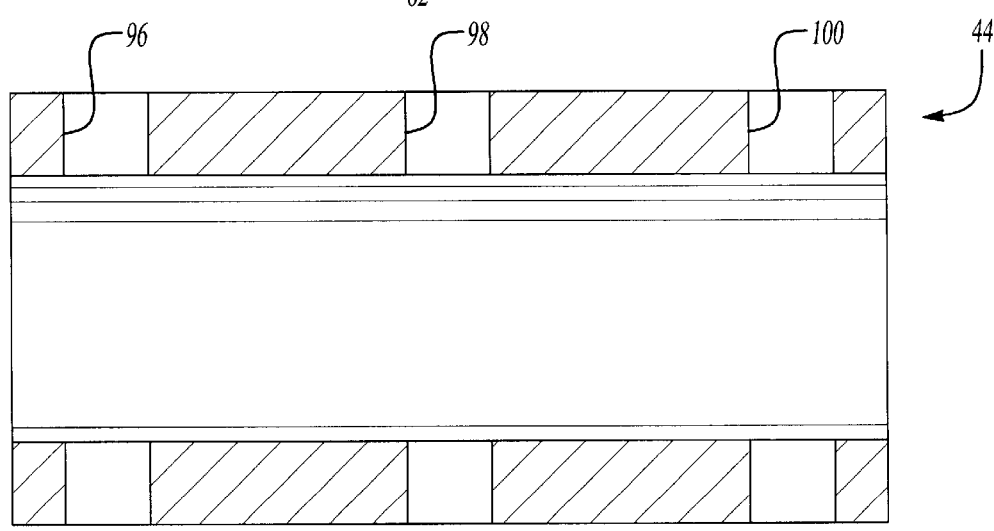
FIG. 7 is a cross-sectional view through the second moving member.
Figure 8:
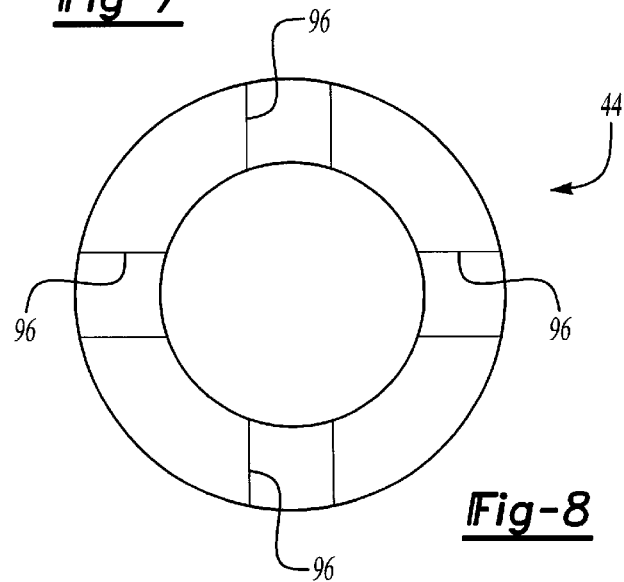
FIG. 8 is a cross-sectional view generally perpendicular to the FIG. 7 cross-sectional view.

FIG. 7 shows the second moving member 44 having pin and teeth openings 96, 98 and 100. As shown in FIG. 8, in a preferred embodiment there are four equally spaced pin slots 96.

Although an intra-axle differential is shown and disclosed, it should be understood that aspects of this invention will extend to inter-axle differentials. The claims should be studied to determine the true scope and content of this invention.

A preferred embodiment of this invention has been disclosed, however, a worker in this art would recognize that certain modifications would come within the scope of this invention. For that reason, the following claims should be studied to determine the true scope and content of this invention.

What is claimed is:

1. A differential comprising:
   a pair of shafts extending in opposed axial directions;
   a cam having first cam grooves associated with each of said first and second shafts; and
   a first moving member having pins received in said first cam grooves in said cams associated with each of said first and second shafts, said first moving member being operable to rotate said first and second cams through said pins received in said first cam grooves, said first moving member also being operable to move axially when there is relative rotation between said first and second shafts.

2. A differential as recited in claim 1, wherein a differential case receives a drive input and surrounds said shafts, and said first moving member.

3. A differential as recited in claim 2, wherein said first moving member drives a second moving member to rotate, said second moving member being axially movable relative to said first and second cams, and axially moveable relative to said first moving member, and said second moving member having a plurality of pins received in a second cam grooves in each of said first and second cam members.

4. A differential as recited in claim 3, wherein said pins in said first and second cam grooves are offset such that an end of stroke position for said first moving member is offset relative to an end of stroke position for a second moving member.

5. A differential as recited in claim 4, wherein said first and second cam grooves are generally sinusoidal, and said end of travel positions being defined by extreme ends of said sinusoidal grooves.

6. A differential as recited in claim 1, wherein a fluid passage extends through said first moving member and allows fluid to travel between chambers positioned at each end of said first moving member.

7. A differential as recited in claim 6, wherein a fluid resists movement of said first moving member as the speed of said first moving member increases.

8. A differential as recited in claim 7, wherein at least one valve is mounted in said passage, said at least one valve limiting further movement of the fluid through said passage as the speed of said first moving member increases.

9. A differential as recited in claim 8, wherein said valve is spring biased to an open position at which it allows flow of fluid through said passage, but is moved by a force from the fluid towards a closed restricted position as the speed of said first moving member increases.

10. A differential comprising:

a case for receiving a drive input;

a pair of shafts extending in opposed axial direction;

a cam having first and second cam grooves associated with each of said first and second shafts, and fixed to rotate with a respective one of said first and second shafts;

a first moving member having pins received in said first cam grooves in said cams associated with each of said first and second shafts, said first moving member being constrained to rotate with said case and said first moving member being operable to rotate said first and second cams through said pins received in said first cam grooves, said first moving member also being operable to move axially when there is relative rotation between said first and second shafts;

a second moving member being driven to rotate with said first moving member, said second moving member being axially movable relative to first and second cams and axially movable relative to said first moving member, said second moving member having pins received in second cam grooves in said first and second cams, such that upon relative rotation between said first and second shafts, said second moving member being operable to move axially; and movement of said first and second moving members being out of phase.

11. A differential as recited in claim 10, wherein said pins in said first and second cam grooves are offset such that an end of stroke position for said first moving member is offset relative to an end of stroke position for a second moving member.

12. A differential as recited in claim 11, wherein said first and second cam grooves are generally sinusoidal, and said end of travel positions being defined by extreme ends of said sinusoidal grooves.

13. A differential as recited in claim 10, wherein a fluid passage extends through said first moving member and allows fluid to travel between chambers positioned at each end of said first moving member.

14. A differential as recited in claim 13, wherein a fluid resists movement of said first moving member as the speed of said first moving member increases.

15. A differential as recited in claim 14, wherein at least one valve is mounted in said passage, said at least one valve limiting further movement of the hydraulic fluid through said passage as the speed of said first moving member increases.

16. A differential as recited in claim 15, wherein said valve is spring biased to an open position at which it allows flow of fluid through said passage, but is moved by a force from the fluid towards a closed restricted position as the speed of said first moving member increases.

* * * * *